United States Patent [19]
Hornbeck et al.

[11] Patent Number: 4,571,603

[45] Date of Patent: * Feb. 18, 1986

[54] DEFORMABLE MIRROR ELECTROSTATIC PRINTER

[75] Inventors: Larry J. Hornbeck, Van Alstyne; William E. Nelson, Dallas; James T. Carlo, Missouri City, all of Tex.

[73] Assignee: Texas Instruments Incorporated, Dallas, Tex.

[*] Notice: The portion of the term of this patent subsequent to Apr. 10, 2001 has been disclaimed.

[21] Appl. No.: 568,938

[22] Filed: Jan. 10, 1984

Related U.S. Application Data

[63] Continuation of Ser. No. 317,717, Nov. 3, 1981.

[51] Int. Cl.$^4$ ............................................. G01D 15/14
[52] U.S. Cl. .................................... 346/160; 346/154; 346/108; 340/783
[58] Field of Search ...................... 346/154, 153.1, 160, 346/76 L, 107, 108; 350/360; 354/5; 340/783

[56] References Cited

U.S. PATENT DOCUMENTS

| | | | |
|---|---|---|---|
| 3,435,445 | 3/1969 | Clendinning et al. | 340/783 |
| 3,701,586 | 10/1972 | Goetz | 350/360 |
| 3,912,371 | 10/1975 | Redman | 350/360 |
| 4,001,635 | 1/1977 | d'Auria et al. | 350/360 X |
| 4,035,061 | 7/1977 | Sheridon | 350/360 |
| 4,380,373 | 4/1983 | Sprague | 350/360 X |
| 4,441,791 | 4/1984 | Hornbeck | 350/360 X |

OTHER PUBLICATIONS

Flannery, Jr., Light-Controlled Light Valves, IEEE Transactions on Electronic Devices, Nov. 1973, pp. 941-953.
Spatial Light Modulators, David Casasent, Proceedings of the IEEE, Jan. 1977, pp. 143-157.
Cosentino et al., A Membrane Page Composer, RCA Review, Mar. 1973, pp. 45-74.
Thomas et al., The Mirror Matrix Tube: A Novel Light Valve for Projection Displays, IEEE Transactions on Elec. Dev., Sep. 1975, pp. 765-775.
Tults, A Facsimile Printer Utilizing an Array of Liquid Crystal Cells, Proceedings of the S.I.D., Fourth Qtr. 1971, pp. 199-203.
Reizman, An Optical Spatial Phase Modulator Array, Activated by Optical Signals, Perkin-Elmer Corp., pp. 225-230.
Braatz et al., A Fast Silicon Photoconductor-Based Liquid Crystal Light Valve, IEDM of IEEE, Dec. 1979, pp. 540-541.
Petersen, Silicon Torsional Scanning Mirror, IBM J. Res. Develop., Sep. 1980, pp. 631-637.
Preston, Jr., The Membrane Light Modulator and its Application in Optical Computers, Acta, 1969, vol. 16, No. 5, pp. 579-585.

*Primary Examiner*—Thomas H. Tarcza
*Attorney, Agent, or Firm*—Carlton H. Hoel; Robert O. Groover; James T. Comfort

[57] ABSTRACT

An image projection system for producing a projected image in response to electrical signals which represent the image to be projected. The projection system includes input capability to produce electrical signals in response to an image to be projected. These electrical signals are then transmitted to a light modulator which receives light from an external source. The light modulator consists of arrays of deformable mirrors which selectively deflect the light from the external source in response to the electrical signals received from the input capability. The deflected light is absorbed by opaque stops. The undeflected light travels through optics which form the projected image. A printer using this image projection system is also disclosed. The printer further includes the ability to develop the projected image in such a manner that the image is transferrable to a paper surface in a printer in such a manner that the image is reproduced upon the surface in a printer form.

14 Claims, 10 Drawing Figures

DEFORMABLE MIRROR ELECTROSTATIC PRINTER

This application is a continuation, of application Ser. No. 317,717, filed Nov. 3, 1981.

BACKGROUND

1. Field of the Invention

This invention relates to printing and more specifically to electrophotographic printing.

2. Description of Prior Art

Line printing can be divided into two areas; impact and non-impact printing. Impact printing relates to a device that has one or more character elements, a ribbon or other inking device, a paper transport and some capability of impacting the desired character elements on the paper transferring the physical image of the character element through the ribbon leaving an ink impression of the character element on the paper. Non-impact printing relates to devices that use other than mechanical means to transfer images onto paper. The area of non-impact printing includes direct electrostatic, magnetic, ink jet and electrophotographic printing. An example of direct electrostatic printing is contained in U.S. patent application Ser. No. 267,225, filed May 26, 1981, now abandoned. The electrostatic printer uses a dielectric drum which is selectively charged at certain pixel sites and then exposed to a toner with charger toner particles that are attracted to the charged pixel sites. The drum with charged toner then contacts paper in such a manner that the toner is transferred to the paper leaving a clean drum. Magnetic printing is similiar, except the drum contains magnetized pixel sites and the toner contains magnetic toner particles. An example of a magnetic printer is the 3M Magnastylus. Ink jet printing involves the production of a stream of ink directed at the paper. The stream is controlled by electrostatic acceleration and deflection of the ink particles to form characters on paper. The last non-impact printing area is electrophotographic printing. Electrophotographic printing is a xerographic process using light and a photoreceptor drum and toner to transfer characters to paper. The electrophotographic printers include a light source that is modulated to selectively project light upon a photoreceptor drum made of a photosensitive dielectric that has been electrically charged. Areas of the drum where light is projected become electrically neutral so that the drum then becomes selectively charged. The drum passes through a toner station where charged toner particles come into contact with the drum. The toner particles adhere to the drum at the charged areas and do not adhere to the uncharged areas. The drum then comes is contact with paper which is also charged. The drum then transfers the toner particles to the charged paper, reproducing the image to be printed on the paper. The toner is then fused to permanently adhere the toner particles to the paper.

Electrophotographic printing can also be divided into several areas including laser printing, liquid crystal display (LCD) printing, visible light emitting diodes (VLED) printing and printing using a cathode ray tube. Laser printers include solid state lasers and gas lasers. Solid state laser printers control the laser light by using either polygomirrors, acoustooptic scanners or a diffraction grating. Gas laser printers control the laser light by using acoustiooptic deflectors or rotating polygon mirrors. Manufacturers of polygon mirror laser printers include Cannon, Xerox and IBM. LCD printers are of two types: transmissive and reflective. The transmissive type controls the light from a separate light source which passes through the LCD device onto the photoreceptor drum. The reflective type is similar except light is reflected by the LCD device. LCD printers have been the subject of many papers such as "A New Electrical to Optical Image Converter—The CCD Liquid Crystal Light Value" by P. O. Braatz, et al, published in the 1980 *Biennial Display Research Conference Proceedings*, "A Fast Silicon Photoconductor—Based Liquid Crystal Light Value" by P. O. Braatz et al, published in the 1979 *IEDM Proceedings* and "A Facsimile Printer Utilizing an Array of Liquid Crystal Cells" by Juri Tults published in the *Proceedings of SID* Vol. 1214 Fourth Quarter 1971. One manufacturer of LCD printers is Static Systems Corporation. VLED printers include the fixed linear array type which project light through a line of VLED dots onto a rotating photoreceptor drum and the scanning type which further include scanning a limited aray by a raster motion. Printers using cathode ray tubes (CRT) include projection CRT's using self-focusing lenses and fiber optic CRT's. Manufacturers of CRT printers include Wang and Konishiroku.

An additional type of electrophotographic printer uses a deformable mirror display (DMD) projection system and is the subject of the present application.

A form of the deformable mirror display is discussed in a paper entitled, "A Membrane Page Composer" by L. S. Cosentino and W. C. Stewart, published in the RCA Review, Vol. 34, p. 45, March 1973. Another paper that discusses deformable mirrors is titled, "The Membrane Light Modulator and its Application in Optical Computers" by Kendall Preston, published in the OPTICA ACTA, Vol. 16, No. 5, pages 579-585, 1969. A form of the DMD is described in detail in U.S. patent application, Ser. No. 183,595. The object of the DMD projection printer is to provide at a moderate cost a printer that can print at the rate of 10 to 40 pages per minute on most plain paper with a resolution of 300 pixels per inch vertically and horizontally.

SUMMARY OF THE INVENTION

In accordance with the present invention, a light modulator projection system is disclosed which includes elements that deflect light according to input data. Also disclosed is a printer device that uses this projection light modulator to project light upon a photosensitive surface in order to print data determined by the input.

In one embodiment of this invention, a projection system is disclosed that uses an area array of deformable mirror elements that deflect light according to inputs received. The deformable mirror device itself receives serial input and transforms this data into parallel inputs to be used to charge the deformable mirror elements to deflect light, if required. This light is then transferred through optics onto a surface. Light for the deformable mirror device is provided by an external source.

In another embodiment of this invention, a printer system is provided using a light bar to provide lighted pixel points on a single line across a photosensitive area. The light bar consists of a single line of deflectable mirror elements that receive commands to deflect or not to deflect light according to data input.

BRIEF DESCRIPTION OF THE DRAWINGS

FIG. 7b is a top view of light bar illustrated in FIG. 7a.

DESCRIPTION OF THE INVENTION

This discussion will include the embodiment of this invention in two separate applications. The first application is a projected system to produce an image from input data. The second is a xerographic or electrophotographic type line printer.

Figure 1:
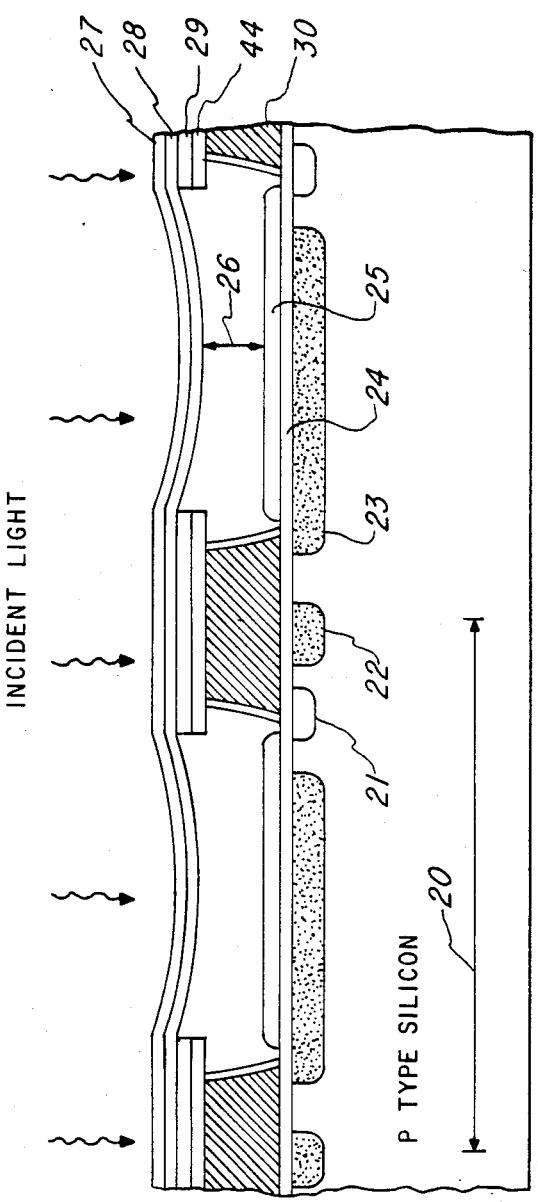
FIG. 1 is a cross section side view of two elements of the deformable mirror device.

FIG. 1 illustrates a cross section of the line addressable light modulator containing a deformable mirror device. It should be noted that the light modulator array itself is illustrated in U.S. Pat. No. 4,441,791 which is herein incorporated by reference. Referring to FIG. 1, incident light illuminates the mirrored surface represented as a membrane metallization 28 underneath a membrane substrate 27. The membrane metallization 28 rests on a mirror contact 29 which in turn rests on an SiO$_2$ layer 44 overlying a polysilicon gate 30. A gate oxide 24 isolates the polysilicon gate 30 from the underlying p-type substrate. The N+ drain 22 is charged to a predetermined voltage by the address circuitry (not shown). Gate 30 which surrounds air gap 26 is then pulsed to a positive voltage, thus turning on the transistor formed at the intersection of drain 22 and gate 30. The floating N+ diffusion 23 is then charged to the voltage level of drain 22. Gate 30 is then pulsed negative or to substrate potential to turn off the transistor, thus isolating the floating diffusion 23. The voltage on the floating diffusion 23 remains at a fixed level subject only to a decay caused by photo-generated or dark leakage currents.

The membrane metallization is spaced apart from a floating field plate 25 by a distance 26 typically 0.6 microns. The floating field plate 25 serves to block any residual light which is not absorbed or reflected by the membrane metallization 28. The membrane metallization 28 and the field plate 25 form the respective plates of an air gap capacitor. The membrane is attracted to the field plate by a distance proportional to the voltage drop across the air gap. The voltage drop is the difference between the fixed DC bias maintained on the membrane metallization and the voltage set on the floating diffusion by the address transistor. The deformed mirror results in light deflection proportional to the address voltage on the drain 22. The mirrors are addressed periodically at some fixed frame rate.

Channel stop 21 prevents interaction between the address transistors. The N+ implant 22 and 23 are placed upon p-type silicon. The mirror element pitch 20 is approximately 50 microns.

Figure 2:
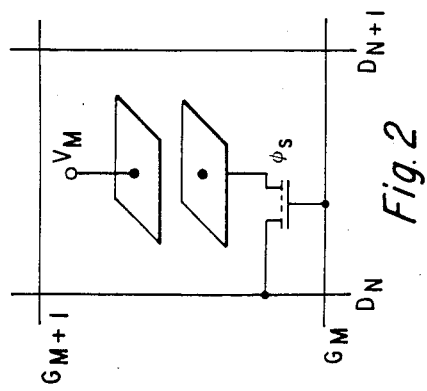
FIG. 2 is a schematic diagram of a single element of the deformable mirror device.

FIG. 2 illustrates schematically the transistor and the deformable mirror air gap capacitor formed at the intersection of gate G$_m$ and drain D$_n$.

Figure 3:
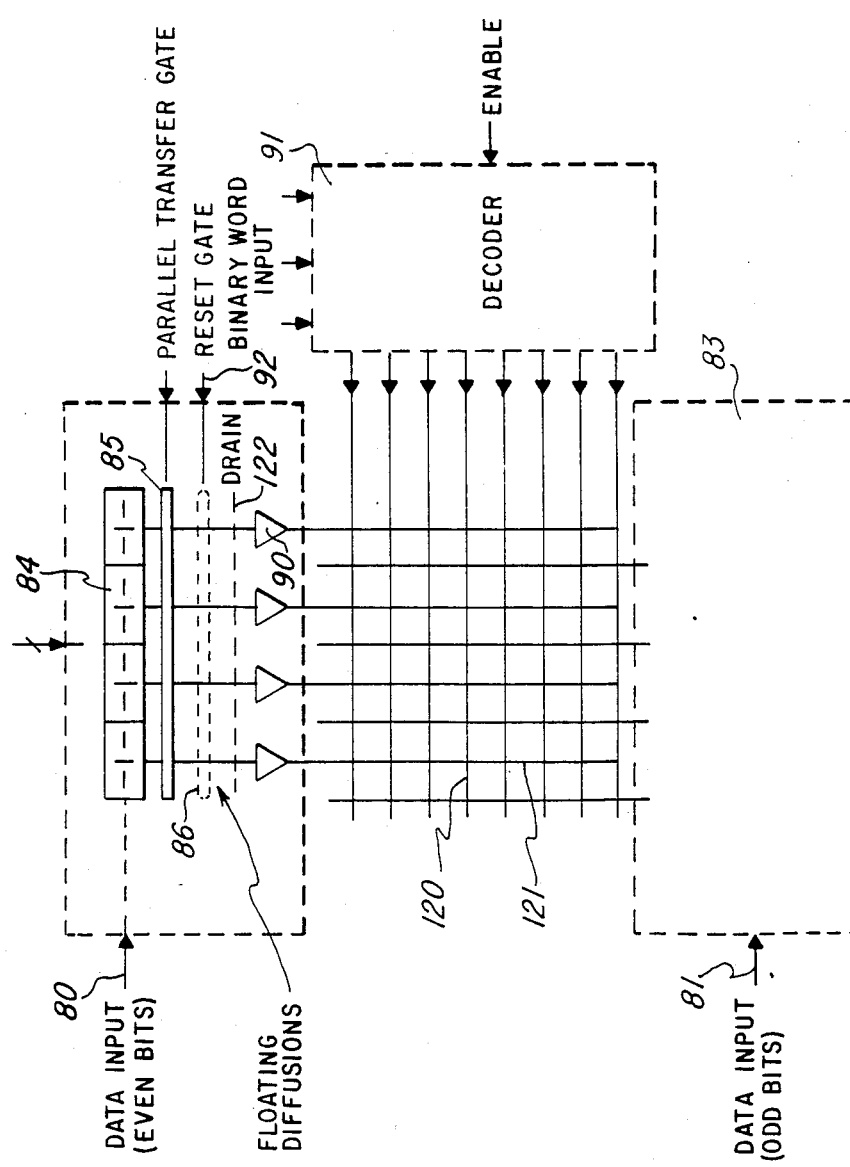
FIG. 3 is a block diagram of the deformable mirror device used as a light modulator for an image projection system.

An x-y array of deformable mirrors and the associated address circuitry is illustrated schematically in FIG. 3. The lines 121 are the transistor drains. The lines 120 are the transistor gates. The intersections of lines 120 and lines 121 represent the deformable mirror elements. Serial data is fed into inputs 80 and 81 (even bits into input 80, odd bits into input 81). Block 83 is the same for both the even bit data inputs and the odd bit data inputs. The serial data is converted to parallel data by the charge coupled shift register or converter 84. When one line has been inputted into the delay line, the parallel transfer gate 85 is activated to produce a parallel dump of data bits in the form of charge packets onto the floating diffusions 86. When this parallel dump has been completed, gate 85 is turned off and the next line of data is fed into shift register 84. As the next line is inputted, line driver amplifiers 90 respond to the change in voltage on the floating diffusions and charge the transistor drain lines 121 to voltages proportional to the inputted data. A binary word inputted into the decoder 91 together with an enable pulse causes one of the gate lines 120 to be selected and turned on. All of the floating diffusions of the individual mirror elements in that particular gate line are thus charged to the voltages of their respective drains.

Having inputted the data to the mirror elements of that particular line, the gate is turned off. The inputted data is now stored on that line and the elements on that line respond accordingly. The voltages of the floating diffusions 86 are now reset to an initial value to prepare for the parallel dump of data charge from the next line. The reset gate 92 drains the signal charge to a reset drain 122. The cycle begins again and is repeated one line at a time in a sequential or random sequence.

Figure 4:
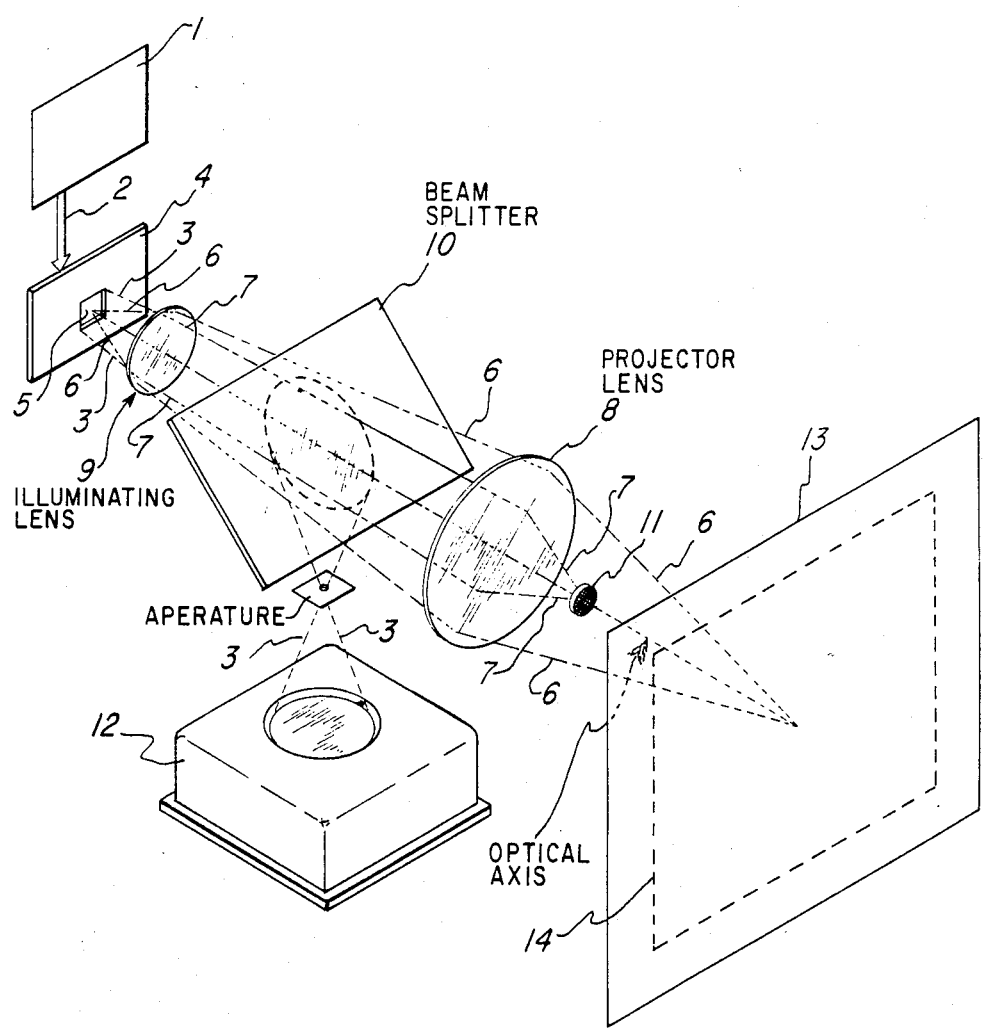
FIG. 4 is an illustration of the invention used as an image projection system.

Referring to FIG. 4, the projection system application is illustrated. The deformable mirror device 4 receives light 3 from an external source 12 via beam splitter 10. The light from the external source 12 is concentrated in the active area 5 on the deformable mirror device 4 by illuminating lense 9. The area 5 contains an x-y array of addressable mirror elements which can be electrically controlled to deflect light or to not deflect light according to inputs from line 2 originating from an input device 1. Light that is undeflected is illustrated by line 7. This light travels through lens 8 into an opaque light stop 11. The sole purpose of the opaque light stop 11 is to absorb the undeflected light from the surface 5 emanating from the undeflected mirror elements and the surrounding support structure. The deflected light 6 travels through lens 8 and passes as shown by lines 6 onto a surface 13 which may be a photoreceptor drum to illuminate a general area 14. Area 14 will appear to a viewer to be consisting of an x-y array of lighted or unlighted pixel elements representing a magnified image of the area 5. These pixel elements that are lighted represent the deflected light and the dark pixel elements represent the undeflected light. Therefore, the user of this invention can project an image onto a surface 13 by providing an input into device 1. Input device 1 can be an operator interface (such as a keyboard) to allow an operator to specify the image to be projected. This image data may be transformed into serial data which is then transmitted to a serial-to-parallel converter to provide appropriate signals to the floating diffusions underlying the deformable mirror elements.

FIG. 4 may also be viewed as a conventional Schlieren optics system. Collimated light is produced at the active device 5 via the illuminating lens 9 and reflected off of the beam splitter 10. Light from the source 12 is admitted to the system through an aperture in order to achieve collimation at the device 5. Lenses 8 and 9 act in combination to image the input aperture onto the Schlieren stop 11 when the mirrored surface at 5 is flat and undeflected. This stops the unwanted component of light from the support structure surrounding the mirror elements. The undeflected component is shown by lines 7. When a mirror element is deflected, the input aperture for that element is no longer imaged on the stop 11. The light from the deflected element passes by the stop shown by lines 6 and is re-imaged via the combination of lenses 8 and 9 onto a new location at screen 13 with a magnification determined by lenses 8 and 9 in combination.

Figure 5:
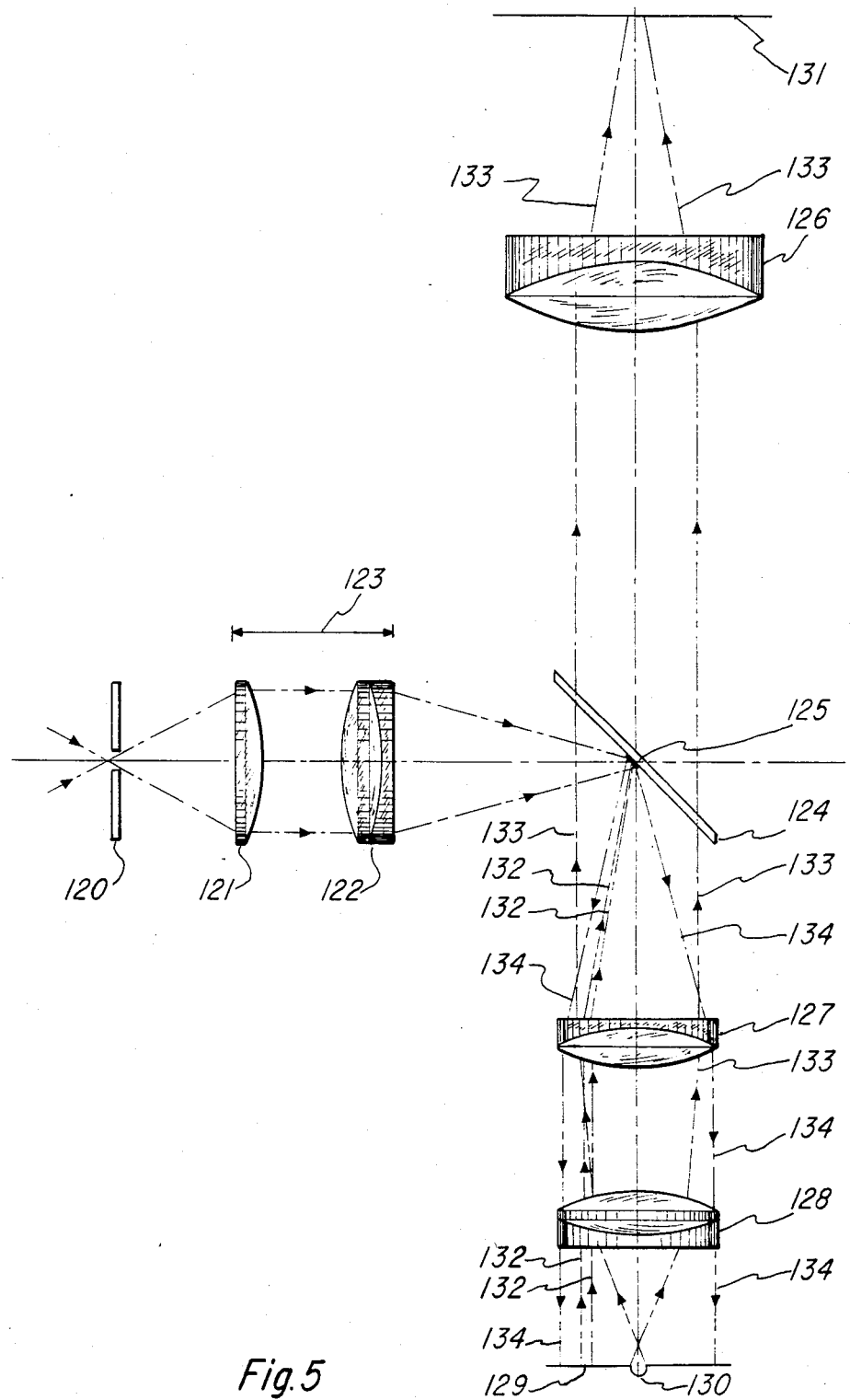
FIG. 5, is an illustration of an optical system with combined input aperture/complimentary output stop element for the deformable mirror device.

FIG. 5 illustrates an alternate embodiment of a relatively compact optics system that projects light upon the deformable mirror elements and takes the deflected light to produce a spot on a surface. Light is input through a pin hole 120 through lens 121 which collimates the light which travels to lens 122. Lens 121 and 122 are some distance apart shown by line 123. Lens 121 may be moved toward or away from the pin hole 120 in order to properly gather light from the pin hole 120. Lens 122 may be moved so that the light from lens 122 is focused upon a transparent substrate 124 which contains a small electrical mirror element 125. Lens pair 121 and 122 are provided to remove any chromatic light aberations and to focus the light from pin hole 120 onto mirror 125. The light from the mirror element 125 is then reflected into lens 127 as shown by lines 134. This light is again collimated by lens 127 and transmitted to lens 128. Lenses 127 and 128 have a focal length which lie at the location of the mirror element 125 on the glass plate 124 and on the deformable mirror elements 130 and 129. Therefore light from lens 128 is transmitted to the deformable mirror elements 129 and 130. Element 129 illustrates a non-deformed mirror which produces undeflected light represented by lines 132. This undeflected light is transmitted from mirror element 129 through lenses 128 and 127 to the mirror element 125 on glass plate 124. Therefore, mirror element 125 acts as a stop to light traveling from the undeformed mirror elements. In effect, it performs the dual function of appearing to be an input aperture as well as performing as a complementary output stop. If the mirror element is deformed, such as mirror element 130, the light is deflected and shown by lines 133. This light is transmitted through lenses 127 and 128 but is not focused into the mirror element 125, but rather passes through the transmission glass plate 124 onto a projection lens 126 which focuses this light 133 onto a surface 131 which may be representing a photoreceptor drum with an appropriate lateral magnification. Therefore, the deflected light from the deformed mirror element 130 produces a lighted dot on surface 131 and correspondingly, a white (untoned) dot on the printed page.

Figure 6:
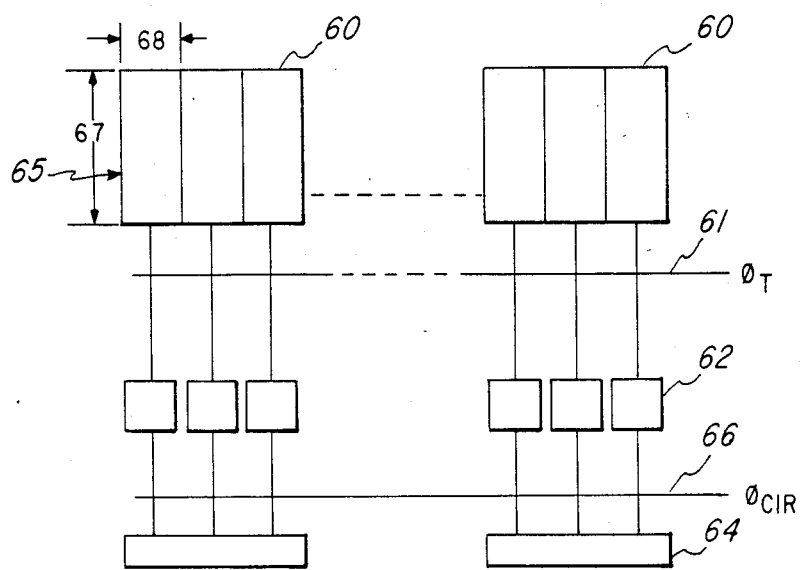
FIG. 6 is a block diagram of the light bar.

The printer application of this invention requires only a linear array of deformable mirror elements to modulate the light that is projected onto a rotating photosensitive drum using previously described optical systems. FIG. 6 represents a block diagram of a linear array of deformable mirror elements 62 or light bar driven by a CCD shift register 60. The deformable mirror elements 62 differ from those described for the area array device (FIG. 3) in that elements 62 are addressed directly by charge packets propogated by a CCD shift register 60. Therefore, the drains 22 (FIG. 1) are not required in order to input charge to the floating diffusions of the mirror elements. The line driver amplifiers 90 (FIG. 3) are not required because the capacitance which must be driven in the linear array is much smaller than for the area array.

Serial data is fed into input 65 and is converted to parallel data by a charge coupled shift register 60. When one line of data has been inputted into the shift register 60, the parallel transfer gate 61, previously turned off, is turned on. The elements of the shift register 60 which are turned on and thus storing the data charge, are now turned off. The charge packets are thus transferred from the shift register directly to the floating diffusions underlying the air gaps of the deformable mirror elements 62. Gate 61 is now turned off. The mirror elements are deformed by an amount proportional to the inputted charge.

While the mirror elements are exposing one line, the next line is inputted into the shift register. Just prior to the dump of data from the shift register 60 to elements 62, the clear gate 66 is turned on and the potential of the floating diffusions of elements 62 are reset to a reference voltage level determined by drain 64.

By increasing the area of the elements of shift register 60, a greater amount of charge can be transferred to the floating diffusion under minor element 62. In particular, the inputted charge is proportional to $W \times L$ where W is the channel width 67 and L is the channel length 68. The voltage change at the floating diffusions of deformable mirror elements 62 is approximately linearly proportional to the charge dumped onto the diffusion. Therefore, the voltage change produced at elements 62, for a given input voltage at 65, is approximately proportional to $W \times L$. For example the voltage change at elements 62 can be increased approximately four times by making W four times greater for a fixed L. In this fashion, a voltage gain can be realized between the input 65 and the floating diffusions of 62, thus reducing the requirements on drive voltage for shift register 60.

Figure 7A:
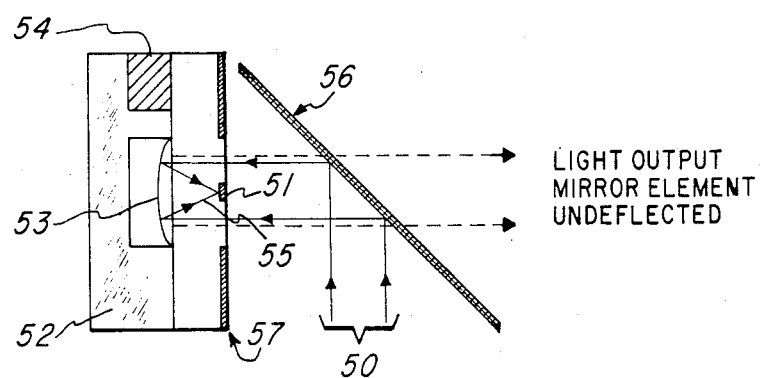
FIG. 7a is a side view of a totally modularized or self stopped light bar that is used in the printer application.
Figure 7B:
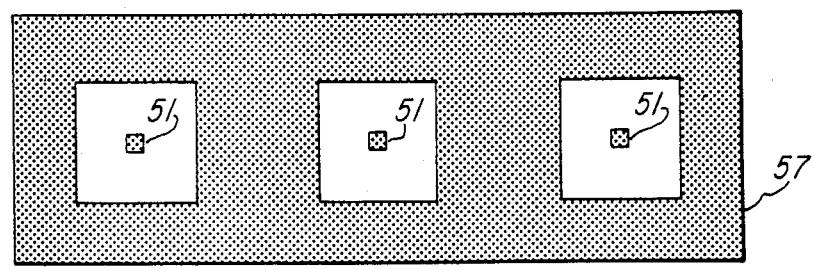

A preferred embodiment of the light bar is illustrated in FIG. 7. The incident collimated light represented by lines 50 is transmitted into a beam splitter 56 which reflects the collimated light into the deformable mirror element 53. The deformable mirror element deflects the light according to inputs received from a charge coupled device shift register 54 upon a semiconductor substrate 52. The deflected light represented by lines 55 are transmitted into opaque light stops 51. If the light is not deflected, it travels through the beam splitter 56 and outward towards the lens 35 in FIG. 8. Opaque light stops 57 serves to block light that would reflect from the non-active area of the light bar.

Blocking light from the non-active area serves to increase the contract ratio by making the projected image insensitive to defects and surface contours present in the non-active area. Another advantage of this light bar embodiment is that one less lens is required since the light bar contains its own stop. The self-contained coverglass is also advantageous since its alignment will not be required due to vibrations or thermal variations. Lastly, this embodiment is advantageous because only the deformable mirror element images to be printed need to be activated. In many applications, most of the deformable mirror elements will not be activated, thus improving reliability.

FIG. 7a is a top view of the light bar in FIG. 7. Note that opaque light stops 57 and 51 have been aligned and properly spaced with respect to the deformable mirror elements 53.

Figure 8:
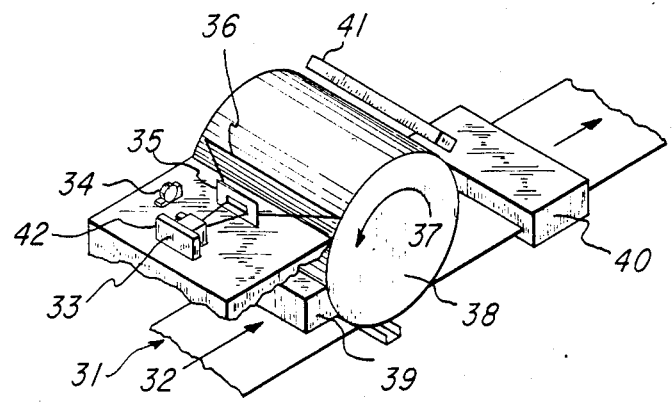
FIG. 8 is an illustration of this invention as applied to a printer application.

FIG. 8 illustrates an embodiment of this invention as applied to a printer. This printer consists of a standard photoreceptor drum 38 which rotates in a direction illustrated by 37. The external light source 34 is located to provided light to the optics module 33. The optics module 33 contains a DMD light bar and optics such as shown in FIGS. 5 or 7. The optics module 33 produces a line of dots, lighted or unlighted, according to an input. The light is transmitted through projection lens 35 onto a line on the photoreceptor drum 38 represented by line 36. As previously discussed, lighted areas on an electrostatically charged photoreceptor drum will become neutral. The unlight areas will remain charged. The drum then rotates and comes into contact with the toner station 39 containing charged toner particles which adhere to the charged area of the photoreceptor drum 38. The photoreceptor drum 38 continues to rotate and comes in contact with paper 31 travelling in a direction illustrated by 32. The paper is charged by transfer corona 43 and thus attracts the charged toner particles that are on the photoreceptor drum 38. The paper then passes through a fuser 40 which heats the toner particles on the paper causing them to permanently fuse upon the paper. Therefore, sequential lines of lighted dots projected by the light bar 33 upon transverse line 36 on the rotating photoreceptor drum 38 create a latent electrostatic image as the drum rotates. The image is subsequently developed at the toner station and transferred to the plain paper 31 to produce a hard image. The printer receives the data representing the image to be printed from input line 42 which can be from an operator keyboard or some other means for an operator to specify the image. This data is transformed into serial digital data which is transferred via line 42 as input data to a serial-to-parallel shift register in the light bar 33. The data in the parallel portion of the shift register is used as the charge to deflect the individual deformable mirror elements as previously discussed.

FIG. 8 illustrates a printer system showing a single light bar 33 illuminating a pixel line 36 the entire width of the photoreceptor drum. In order to increase the resolution number of pixel elements in a horizontal dot line, it is feasible to optically align the images of two or more DMD elements at the photoreceptor surface. In this case, each individual DMD module with self-contained optics and source would illuminate a respective portion of line 36. It is desirable to keep the size of the silicon substrate upon which the DMD is fabricated to a readily manufacturable size, hence the requirement for multiple arrays to cover the entire page width 36.

Figure 9:
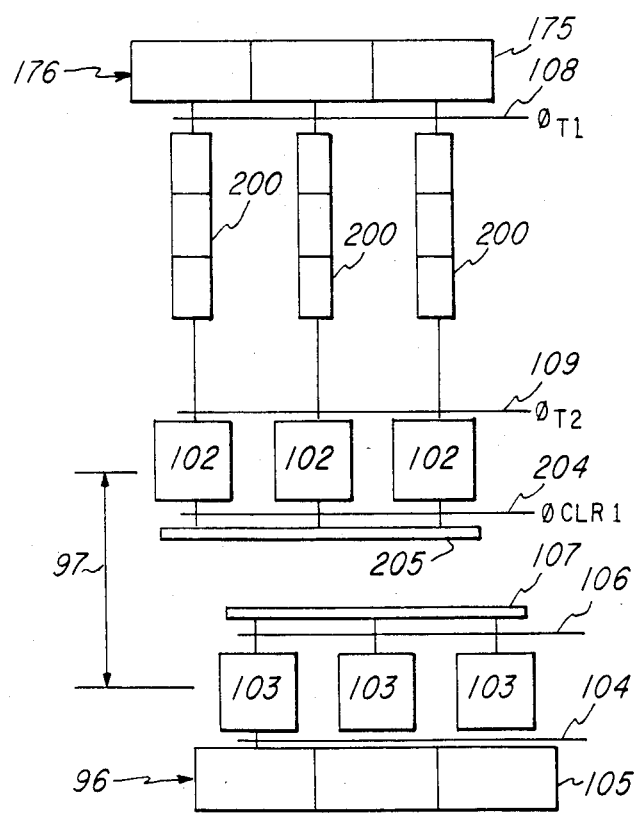
FIG. 9 is a block diagram illustrating a technique to align interlaced deformable mirror devices for the printer application.

An additional technique to increase resolution without having to align the light bar pixel elements vertically and horizontally is illustrated in FIG. 9 which is a block diagram of two separate light bars contained on the same silicon substrate, that are separated by a distance 97. Note that the deformable mirror elements 102 are interspaced between the deformable mirror elements 103. The mirror elements 102 and 103 overlap each other by 20% to 30% in order to evenly illuminate the photoreceptor drum. This interlacing technique uses the fact that the drum is rotating in a single direction such that the line partially illuminated by deformable mirror elements 103 will at later time, be partially illuminated by deformable mirror elements 102. Therefore, if elements 103 are addressed with the odd bits of a line and elements 102 by the even bits, and the imaging by 102 is properly delayed with respect to 103, then a single line can be exposed at twice the resolution and with no dark regions between the active elements.

Odd data bits are read into the shift registers 105 via input 96. This data is then transferred into the deformable mirror elements 103 via gate line 104. Gate line 106 is used to clear the charge from mirror elements 103 to the drain 107. Likewise, the even data bits are transferred via input 176 into the shift register 175 which is then transferred through gate line 108 into a delay area 200 which holds this data for a time representing the time it takes to rotate the photoreceptor drum the distance 97. At that time, the data or charge in the areas 200 is transferred via gate line 109 into the deformable mirror elements 102. The charge in mirror elements 102 is then cleared through gate line 204 to drain 205. The distance 97 is chosen to be an integral number of line spacing(n) on the photoreceptor drum. For n line spacings, n elements are required in delay area 200.

What we claim is:

1. An image projection system comprising:
   input means to produce electrical signals in response to an image to be projected;
   serial-to-parallel shift register to receive the electrical signal from said input means;
   decoder means connected to said input means to receive electrical signals;
   a plurality of light modulator means arranged in an array of columns and rows, said columns connected to said serial-to-parallel shift register and said rows connected to said decoder, said modulator means selectively deflecting external light in response to signals from said shift register and said decoder; and
   optical means to project an image from said selectively deflected light.

2. An image projection system according to claim 1, wherein said serial-to-parallel shift register, said decoder, and said light modulator means are monolithically integrated on a single semiconductor substrate.

3. An image projection system according to claim 1, wherein said input means further includes means to receive data from an image projection system operator than defines the image to be projected.

4. An image projection system according to claim 1, wherein said optical means includes surface to receive the image to be projected.

5. An image projection system according to claim 1, wherein said light modulator means includes a plurality of deformable mirror devices that individually form a curved surface in response to signals from said shift register and said decoder.

6. An image projection system according to claim 5, wherein said deformable mirror devices include light stops to absorb the deflected light.

7. A printer system comprising:
   input means to produce electrical signals in response to an image to be printed;
   a serial-to-parallel register to receive said electrical signals;

a plurality of light modulator means connected in parallel to said serial-to-parallel register, said modulator means to selectively deflect external light in response to data from said serial-to-parallel shift register;

optical means to produce a projected image from said selected light; and printing means to print said projected image upon a surface.

8. A printer system according to claim 1, wherein said serial-to-parallel shift register and said light modulator means are monolithically integrated on a single semiconductor substrate.

9. A printer system according to claim 7, wherein said input means further includes means to receive data from a printer system operator that defines the image to be printed.

10. A printer system according to claim 7, wherein said light modulator means includes a plurality of deformable mirror devices that individually form a curved surface in response to signals from said shift register.

11. A printer system according to claim 10, wherein said deformable mirror devices include light stops to absorb the deflected light.

12. A printer system according to claim 10, wherein said shift register provides a voltage gain to said deformable mirror devices.

13. A printer system according to claim 12, wherein said shift registers contain a greater capacitance than said deformable mirror devices.

14. A printer system according to claim 10, wherein said light modulator means includes a first set of deformable mirror devices and a second set of deformable mirror devices, the first set of mirror devices being vertically offset and laterally interspaced in relation to the second set of mirror devices.

* * * * *